B. R. VAN VALKENBURG.
PIANO PLAYING MECHANISM.
APPLICATION FILED APR. 24, 1912.

1,077,206.

Patented Oct. 28, 1913.
5 SHEETS—SHEET 1.

WITNESSES:
H. A. Stock.
F. P. Schroeder

INVENTOR
BURT R. VAN VALKENBURG.
BY
Harry C. Schroeder
ATTORNEY

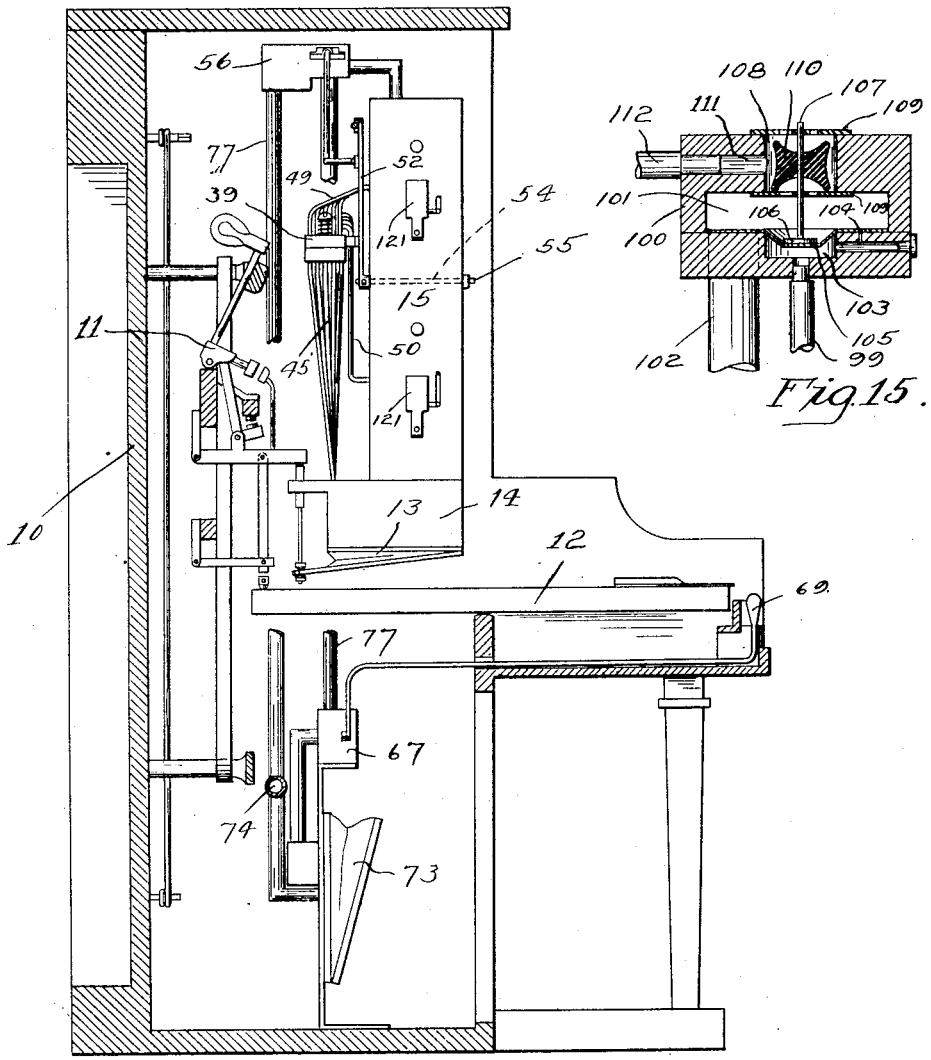

B. R. VAN VALKENBURG.
PIANO PLAYING MECHANISM.
APPLICATION FILED APR. 24, 1912.
1,077,206.
Patented Oct. 28, 1913.
5 SHEETS—SHEET 3.
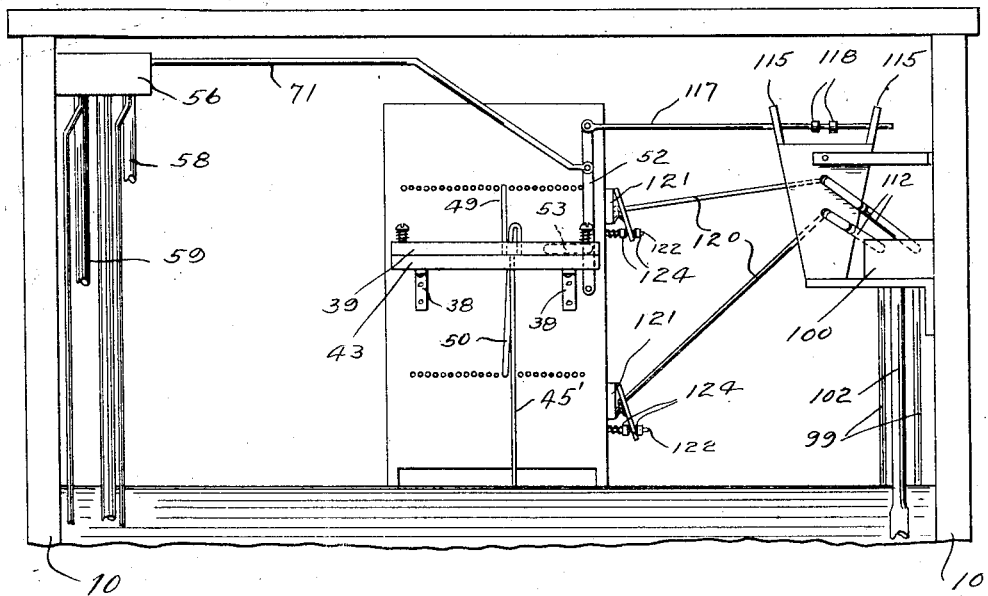
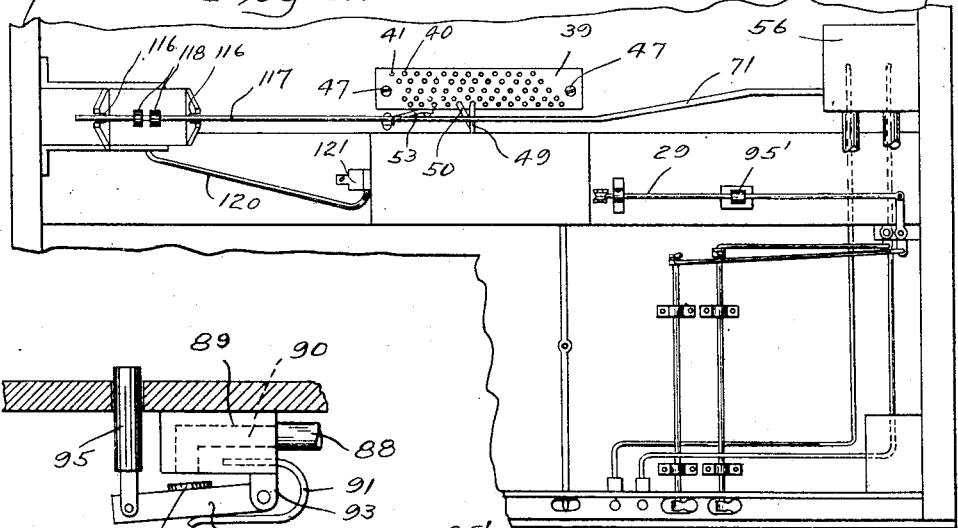
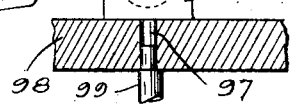
WITNESSES:
W. A. Stock
F. P. Schroeder
INVENTOR
BURT R. VAN VALKENBURG.
BY
Harry C. Schroeder
ATTORNEY

B. R. VAN VALKENBURG.
PIANO PLAYING MECHANISM.
APPLICATION FILED APR. 24, 1912.

1,077,206.

Patented Oct. 28, 1913.
5 SHEETS—SHEET 4.

WITNESSES:
H. A. Stock
F. P. Schroeder

INVENTOR
BURT R. VAN VALKENBURG
BY
Harry Schroeder
ATTORNEY

B. R. VAN VALKENBURG.
PIANO PLAYING MECHANISM.
APPLICATION FILED APR. 24, 1912.

1,077,206.

Patented Oct. 28, 1913.
5 SHEETS—SHEET 5.

WITNESSES:
H. A. Stock
M. M. Escherich

INVENTOR
BURT R. VAN VALKENBURG
Harry C. Schroeder
ATTORNEY

UNITED STATES PATENT OFFICE.

BURT R. VAN VALKENBURG, OF OAKLAND, CALIFORNIA.

PIANO-PLAYING MECHANISM.

1,077,206.  Specification of Letters Patent.  Patented Oct. 28, 1913.

Application filed April 24, 1912. Serial No. 692,818.

*To all whom it may concern:*

Be it known that I, BURT R. VAN VALKENBURG, a citizen of the United States, residing at Oakland, in the county of Alameda and State of California, have invented certain new and useful Improvements in Piano-Playing Mechanism, of which the following is a specification.

This invention relates to player pianos of the type wherein a roll of perforated paper is used to control the production of musical notes.

The principal object of the invention is to provide a player piano of improved construction having a double set of roll actuating mechanisms so that one roll may be used during the rewinding and changing of a second roll, thus making the piano a substantially continuous player.

A second object of the invention is to provide an improved piano of the class described wherein but a single set of pneumatics or hammer mechanism will be necessary, the pneumatics being controlled at will from either of the rolls.

A third object of the invention is to provide an improved connection controlling certain pneumatics which are used for braking purposes.

A fourth object of the invention is to provide an improved arrangement for controlling a certain shifting valve used in connection herewith.

A fifth object of the invention is to provide an improved means for controlling the operation of either of two engines used in connection herewith.

With the above and other objects in view, this invention consists in general of certain novel constructions, combinations and arrangements of parts, as will be hereinafter fully described, illustrated in the accompanying drawings, and specifically claimed.

Figure 1:
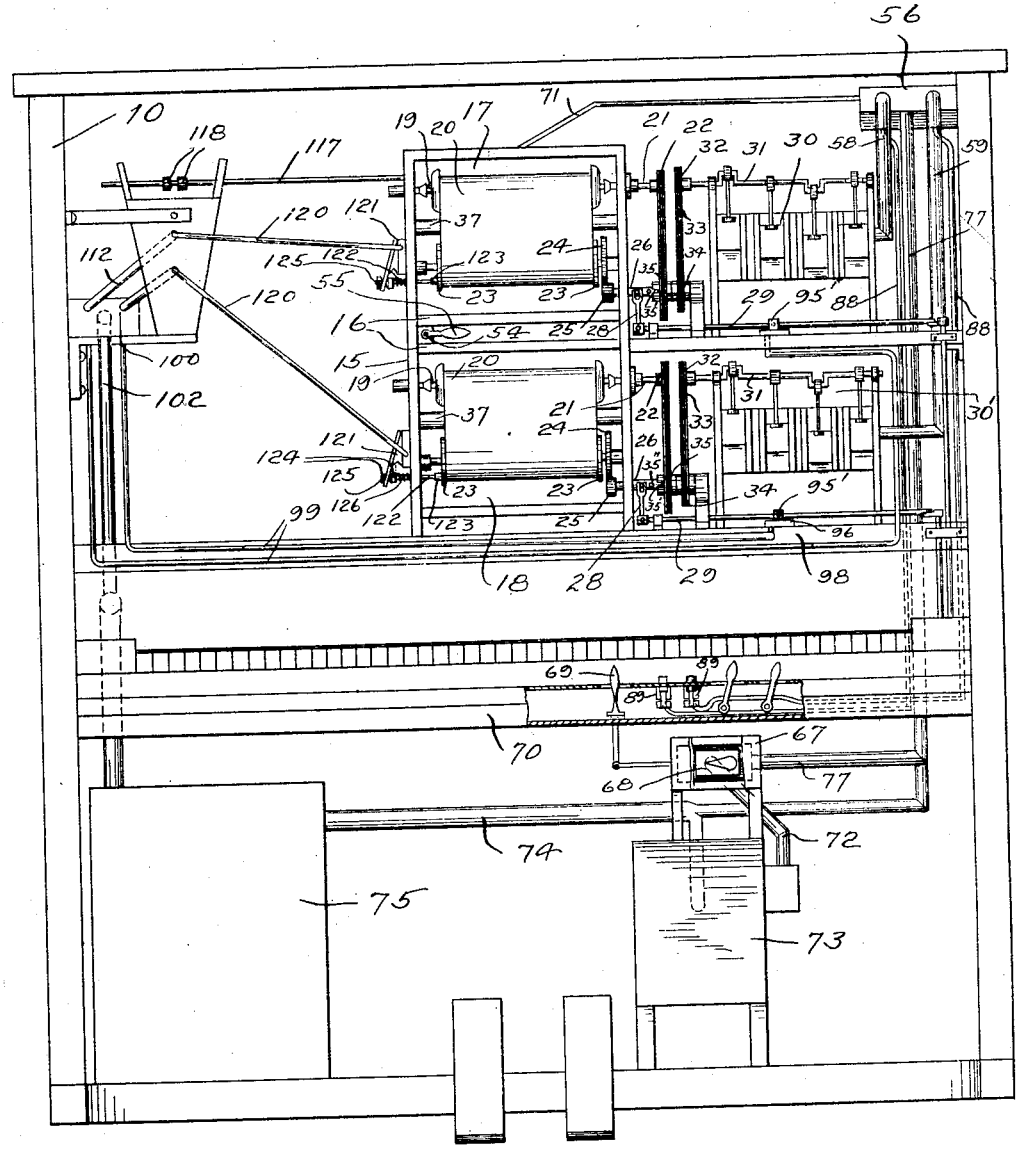
Figure 5:
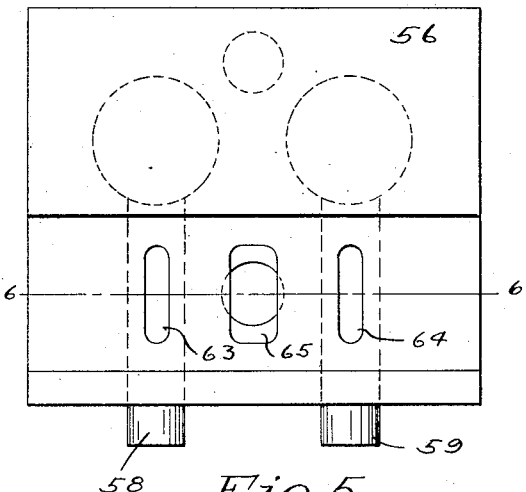
Figure 6:
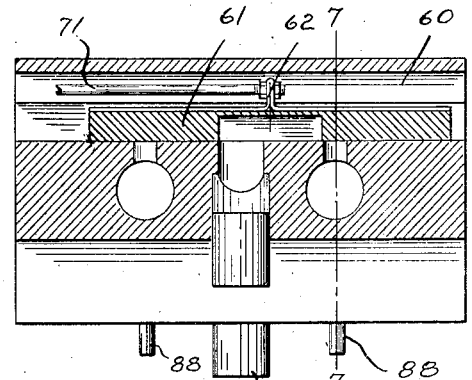
Figure 7:
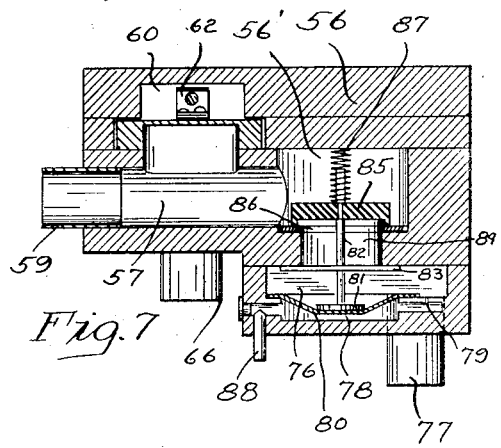
Figure 8:
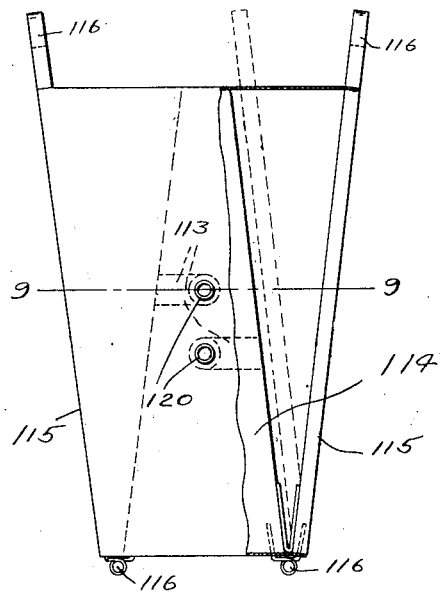
Figure 9:
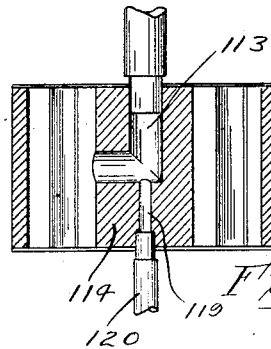
Figure 12:
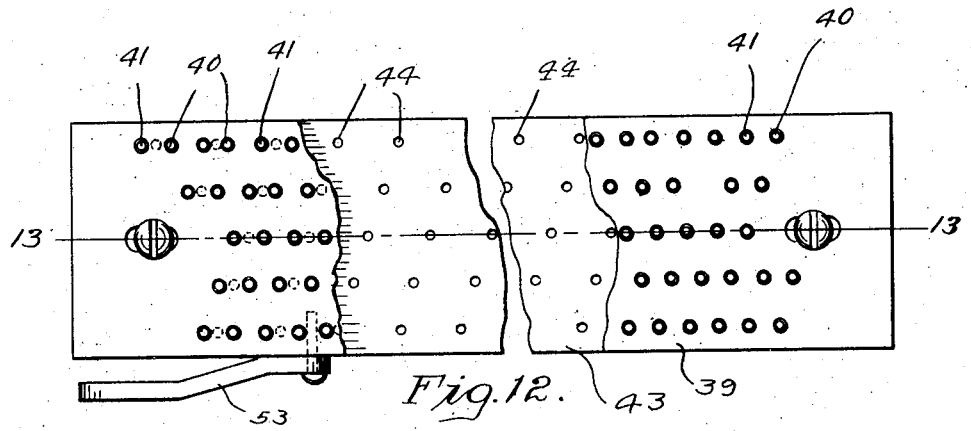
Figure 13:
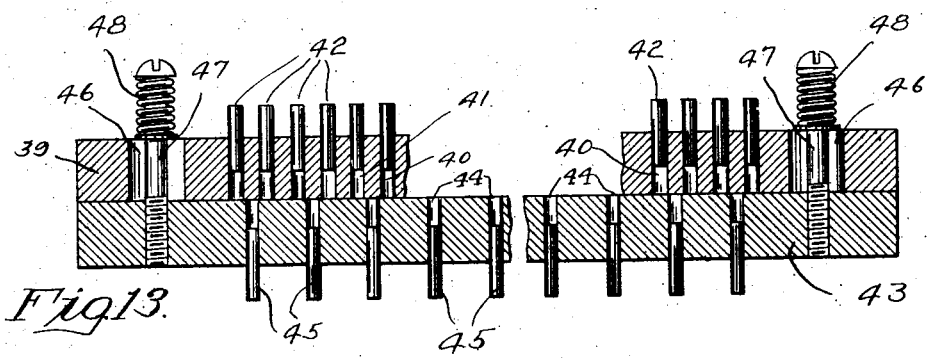
Figure 14:
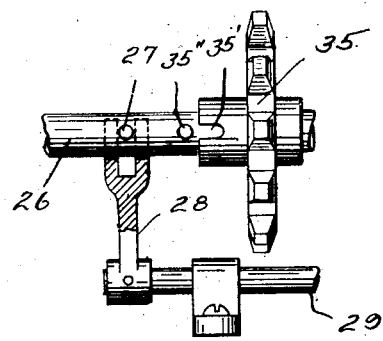

In the accompanying drawings, like characters of reference indicate like parts in the several views, and Figure 1 is a front elevation of a piano constructed in accordance with this invention, the front of the casing being omitted the better to show the interior. Fig. 2 is a transverse section through said piano. Fig. 3 is a view of a certain portion of the mechanism from the rear. Fig. 4 is a plan of a certain portion of the mechanism. Fig. 5 is a plan of a valve box used herewith, the cover plate and valve being removed to show the port arrangement. Fig. 6 is a section on the line 6—6, Fig. 5. Fig. 7 is a section on the line 7—7, Fig. 6. Fig. 8 is a side elevation of the double bellows used herewith, a portion of the flexible membrane being removed. Fig. 9 is a section on the line 9—9, Fig. 8. Fig. 10 is a side elevation of a certain valve used herewith. Fig. 11 is a transverse section through one of the shifter rods used in placing a winding roll in operative connection with an engine. Fig. 12 is a plan of a certain multiple valve used herewith, the same being partly broken away. Fig. 13 is a section on the line 13—13 of such a valve. Fig. 14 is an enlarged detail view partly in section of a shipper rod adjacent one end. Fig. 15 is a view in section through a certain valve used herewith.

The piano constructed in accordance with this invention is provided with the usual casing 10 wherein is mounted the piano action indicated in general at 11 and this action may be controlled manually through keys 12 or may be operated by means of bellows 13 arranged in the usual manner along the vacuum trunk 14 in which trunk vacuum is maintained by means of a vacuum pump or bellows, not shown.

In the front of the instrument there is provided a double casing 15 which is separated by partitions 16 into the upper and lower compartments 17 and 18 respectively. In each of the compartments 17 and 18 there is provided a roll receiving mechanism arranged to receive the journals 19 of the usual music roll 20. Included in each of the roll receiving mechanisms is a shaft 21 having at one end a clutch which engages the clutch end of the respective music roll 20 and at its other end a sprocket 22. Below each of the music rolls 20 there is provided a winding roll journaled in suitable bearings and having a flange 23 at each end. On one of the journals of the music roll there is provided a gear 24 which meshes with a pinion 25 keyed on a short shaft 26 whereon are spaced pins 27 which are engaged by the yoke end of a shipper 28 carried upon a rod 29.

Two separate operating engines are provided as indicated at 30 and 30'. Each of these engines has the usual crank shaft 31 whereon is fixed a sprocket 32 which is connected by means of a chain 33 with a sprocket 34 carried on a shaft carrying also the sprocket 35 which is connected by means of a chain 36 with the sprocket 22. The sprocket 35 is provided with a hub having notches 35' therein and on the shaft carrying this sprocket is a pin 35'' adapted to enter the notches when the shaft is moved in one direction. When the shipper lever 28 of either winding mechanism is moved in one direction the winding roll can be caused to rotate to wind paper thereon while if the shipper lever be moved in the opposite direction the pinion 25 will disengage from the gear 24 and the roll will rewind. Thus by proper manipulation of one or the other of the shipper levers the rolls may be operated at will.

In each of the chambers 17 and 18 there is provided a tracker board 37 of the usual construction. On the back of the casing 16 are mounted brackets 38 upon which is mounted a valve board 39 having a series of holes 40 extending vertically therethrough and a series of holes of like character at 41, the series being in alternate relation to each other and in order to economize in length the holes are arranged in diagonal lines as can readily be seen by reference to Fig. 12. Secured in each of the holes 40 and 41 is an upwardly extending tube 42. Beneath this board and resting directly on the brackets is a similar board 43 having a single series of holes 44 arranged in diagonal lines spaced a distance apart equal to the distance between the holes 40 so that as the upper board is moved longitudinally of the lower board one or the other of the series 40 or 41 is brought into registry with the series 44. Extending downward from each of the holes 44 is a short tube 45, which is connected by tube 45' to the vacuum chest 14. In the board 37 there is provided a pair of slots 46 wherethrough extend screws 47 provided with coiled springs 48 to hold the upper board firmly on the lower and prevent entry of air between the two. From the upper tracker board 37 a series of tubes 49 extend to the tubes carried in one of the series 40 or 41 while from the lower tracker board a similar series of tubes 50 are connected to the remaining tubes 40 and 41.

Pivotally mounted on the casing 15 is a lever 52 which is connected by a link 53 with the board 39 so that as this lever is moved in one direction or the other in like manner will the board 39 be moved to one side or the other and thus bring one of the series of holes 40 or 41 into communication with the series of holes 44. The lever 52 is carried on the end of a shaft 54 which extends through the casing to the front thereof and is provided on its outer end with a lever 55 whereby the shaft may be rotated and the lever 52 moved.

In order to control the movement of the engines 30 and 30' simultaneously with the movement of the board 39 a certain valve box is provided which is best seen in Figs. 5, 6, and 7. This valve box is indicated in general at 56 and consists of a number of layers of board suitably cut out. Within this valve box is a pair of spaced chambers 56' which communicate by passages 57 with tubes 58 and 59 leading respectively to the engines 30 and 30'. Above this pair of passages 57 is a valve way 60 wherein is slidably mounted a D valve 61 having secured thereto an upwardly projecting ear 62. The pipes and passages 57, 58, and 59 communicate with the valve-way through ports 63 and 64 leading respectively to the passages 57. Intermediate these ports is the passage 65 which communicates by means of a pipe 66 with a speed control box 67 containing a valve 68 movable therein and operatively connected to the speed control lever 69 on the key slip 70. The lug 62 is connected to the lever 52 by means of a rod 71 so that whenever the lever is moved in like manner will the D valve be moved and it is to be noted that the dimensions of the valve are such as to connect either the port 63 or the port 64 with the port 65 while when the valve is in its central position, neither will be connected. This speed control valve is in communication with a vacuum pipe 72 leading to the equalizing bellows 73 from whence a pipe 74 leads to a low pressure reservoir 75. Beneath the chambers 56' is a vacuum chamber 76 which communicates by means of a pipe 77 with the pipe 74 directly. Adjacent each end of this chamber 76 is a cell 78 which communicates with the chamber 76 through a bleeder 79. This cell 78 is separated from the chamber 76 by a flexible diaphragm 80 whereon rests a disk 81 carried by the lower end of a valve stem 82 which passes upward through a guide 83 located on the underside of a port 84 opening into one of the chambers 56'. On this valve stem 82 is provided a valve 85, and this valve is preferably made of rubber and has its edge engage a suitable washer 86. The valve stem 82 is continued upward above the valve and this upper end is surrounded by a suitable coil spring 87, the upper end of which rests against the upper side of the chamber 56'.

Leading from each of the cells 78 is a tube 88 which extends to a block 89 carried behind the key slip and provided with a passage 90, with which the tube 88 communicates. Fixed at one end into a suitable slot in the block is a U-spring 91, the free end of which bears against a lever 92 pivoted to an ear 93 on the lower side of the block. On the lever 92 is a disk 94 of suitable material to constitute an air tight closure for the passage 90.

Extending upward through the key is a plunger 95 which is connected to free end of the lever 92 so that by depressing this plunger the passage 90 may be opened to the atmosphere. When this occurs air will be admitted beneath the diaphragm and by reason of the pressure above the diaphragm being less than that beneath the same and the area of the cell being greater than that of the valve 85 this valve will be raised from its seat and the respective engine thus placed in direct communication with the low pressure reservoir and operated at full speed for rewinding.

In order that the valve board shall not remain in active position while either of the rolls are being rewound an automatic device for centering this board is provided. Each of the rods 29 is provided with a collar 95′, the lower edge whereof engages a suitable recess in a block 96 which is arranged to slide over or from an opening 97 in the board 98 supporting the respective engines. From these openings 97 lead tubes 99. At 100 is a vacuum chest wherein is a vacuum chamber 101 communicating with the reservoir 75 by means of a pipe 102. Beneath this chamber 101 is a pair of cells 103 which communicate with the chamber by means of a bleeder 104. Each of these cells is separated from the chamber by a flexible diaphragm 105 whereon rests a disk 106 extending upward from which is a valve stem 107 which passes upward into a valve chamber 108, the stem passing through guides 109 provided with suitable ports arranged to be covered selectively by the valve 110 accordingly as the same is in raised or lowered position. Leading from each of the valve chambers 108 is a passage 111 which communicates by means of a pipe 112 with one of a pair of passages 113 formed in a wedge-shaped block 114 to the wider end whereof is hinged bellows boards 115 normally held in open position by means of springs 116 of coiled wire having their ends driven respectively into bellows boards and block, as clearly seen by reference to Fig. 8. These boards and the block are, of course, covered with a flexible material, such as leather or the like and the passages 113 communicate with the interior of the bellows. The upper ends of the boards 115 are continued upward and provided with suitable slots 116 wherethrough passes a rod 117 which is secured to the upper end of the lever 52 and carries between the slots 116 a pair of adjustable tappets 118. Now, it will be noted that as soon as either of the rods 29 is moved to throw the rewinding device into operation the respective opening 97 will be opened to the atmosphere. Thereupon air will be admitted beneath the diaphragm 105 and this will cause the valve 110 to rise. This will place the vacuum chamber 101 in communication with the proper bellows and that bellows will deflate so that the tappets 118 will be positioned centrally and in consequence the movable valve plate will likewise be positioned centrally.

In order to provide for braking the winding roll during the rewinding operation the respective passages 113 are each connected by means of a passage 119 with a tube 120 which is in turn connected to a bellows 121 mounted on the casing 15.

Through the casing 15 extends a rod 122 which carries on its inner end a brake shoe-head 123 while on its outer end is a pair of spaced collars 124 between which is received the free end of the movable board of the bellows as indicated at 125. A spring 126 surrounds the rod 122 so that after the bellows have been deflated by vacuum being created therein the same will again inflate by the admission of air through the ports of the outer plate 109 to these and other bellows.

There has thus been provided a simple and efficient device of the kind described, and for the purpose specified. It is obvious that many minor changes may be made in the form and construction thereof without departing from the material principles thereof, and it is therefore not wished to confine the invention to the exact form herein shown and described, but it is wished to include all such as properly come within the scope claimed.

Having thus described the invention, what is claimed as new, is:—

1. In a player piano, a plurality of tracker boards, a piano action controlled from said tracker boards, a winding mechanism for each tracker board, a plurality of driving engines, means for operatively connecting each engine to a winding mechanism, a selective valve mechanism for connecting each tracker board to the piano action, and means controlled by said first-mentioned means to simultaneously control the operation of said engines and selective valve mechanism.

2. In a player piano, a plurality of tracker boards, a piano action controlled from said tracker boards, a winding mechanism for each tracker board including rewinding means, a separate driving engine for each winding mechanism, means to connect each engine to its winding mechanism to wind or rewind a roll carried by the winding mechanism, a selective valve mechanism for controlling the operation of the piano action from either tracker board, elements to move either engine connecting means to winding and rewinding positions, and means controlled by said elements for throwing the valve mechanism into cut off position.

3. In a player piano, a plurality of tracker boards, a piano action controlled from said tracker boards, a winding mechanism for each tracker board including rewinding means, a separate driving engine for each winding mechanism, means to connect each engine to its winding mechanism to wind or rewind a roll carried by the winding mechanism, a selective valve mechanism for controlling the operation of the piano action from either tracker board, elements to move either engine connecting means to winding and rewinding positions, and means controlled by said elements for throwing the valve mechanism into cut off position and simultaneously controlling the roll speed of the winding mechanism.

4. In a player piano, a valve casing provided with a plurality of chambers and a valve way having ports communicating with said chambers, said valve way being also in communication with a vacuum tube, a D-valve in said valve way slidable to place either of said chambers in communication with said tube, a vacuum chamber common to both of the first-mentioned chambers and having ports communicating therewith, a cell below each of the first mentioned chambers, a flexible diaphragm separating each cell and the vacuum chamber, a valved air tube leading to each cell, and bleeders leading from said cells to said chamber.

5. In a player piano, a valve casing provided with a plurality of chambers and a valve way having ports communicating with said chambers, said valve way being also in communication with a vacuum tube, a D-valve in said valve way slidable to place either of said chambers in communication with said tube, a vacuum chamber common to both of the first-mentioned chambers and having ports communicating therewith, a cell below each of said first mentioned chambers, a flexible diaphragm separating each cell and the vacuum chamber, a valved air tube leading to each cell, and bleeders leading from said cells to said chamber; in combination with a piano action, a plurality of tracker boards, a selective valve controlling the operation of said action by either tracker board, and a single operating lever for simultaneously moving the D and selective valves, in combination with a plurality of roll actuating mechanisms, and pipes connecting said mechanisms with said chambers.

6. In a player piano, a plurality of winding and rewinding mechanisms, an engine for each mechanism, a clutch for connecting each engine with its mechanism to cause the latter to run in either direction, means to move said clutches, a double bellows, a valve controlled by the bellows, pneumatics controlling said bellows and provided with cells, tubes leading from said cells to points adjacent said means, and valves carried by said means and controlling said tubes, in combination with a plurality of roll actuating mechanisms, and pipes connecting said mechanisms with said chambers.

7. In a player piano, a plurality of winding and rewinding mechanisms, an engine for each mechanism, a clutch for connecting each engine with its mechanism to cause the latter to run in either direction, means to move said clutches, a double bellows, a valve controlled by the bellows, pneumatics controlling said bellows and provided with cells, tubes leading from said cells to points adjacent said means, valves carried by said means and controlling said tubes, and braking devices controlled by said pneumatics, in combination with a plurality of roll actuating mechanisms, and pipes connecting said mechanisms with said chambers.

8. In a player piano, a plurality of winding and rewinding mechanisms, an air engine for each mechanism, a clutch for connecting each engine with its mechanism to cause the latter to run in either direction, means to move said clutches, a double bellows, a valve, controlled by said bellows, pneumatics controlling said bellows, and provided with cells, tubes leading from said cells to points adjacent said means, and valves carried by said means and controlling said tube; in combination with, a plurality of tracker boards, a piano action, and a second valve controlled by said bellows, one of said valves controlling the operation of the piano action from either tracker board, in combination with a plurality of roll actuating mechanisms, and pipes connecting said mechanisms with said chambers.

In testimony whereof I affix my signature in presence of two witnesses.

BURT R. VAN VALKENBURG.

Witnesses:
F. P. SCHROEDER,
W. A. STOCK.

Copies of this patent may be obtained for five cents each, by addressing the "Commissioner of Patents. Washington, D. C."